United States Patent
Lyon et al.

(10) Patent No.: US 10,716,017 B2
(45) Date of Patent: Jul. 14, 2020

(54) TELECOMMUNICATIONS NETWORK TROUBLESHOOTING SYSTEMS

(71) Applicant: ADTRAN, Inc., Huntsville, AL (US)

(72) Inventors: Jeremy Lyon, Huntsville, AL (US); Michael Arnold, Huntsville, AL (US); Ramya Raghavendra, Huntsvile, AL (US)

(73) Assignee: ADTRAN, Inc., Huntsville, AL (US)

(*) Notice: Subject to any disclaimer, the term of this patent is extended or adjusted under 35 U.S.C. 154(b) by 101 days.

(21) Appl. No.: 15/917,952

(22) Filed: Mar. 12, 2018

(65) Prior Publication Data
US 2019/0281476 A1   Sep. 12, 2019

(51) Int. Cl.
| | | |
|---|---|---|
| H04W 24/04 | (2009.01) | |
| G06N 3/08 | (2006.01) | |
| H04L 12/24 | (2006.01) | |
| H04W 24/08 | (2009.01) | |
| H04L 12/26 | (2006.01) | |

(52) U.S. Cl.
CPC ............ *H04W 24/04* (2013.01); *G06N 3/08* (2013.01); *H04L 41/0823* (2013.01); *H04L 41/142* (2013.01); *H04L 41/16* (2013.01); *H04W 24/08* (2013.01); *H04L 41/147* (2013.01); *H04L 41/5009* (2013.01); *H04L 43/08* (2013.01)

(58) Field of Classification Search
CPC .......... G06N 3/08; G06N 3/082; H04L 41/00; H04L 41/14; H04L 41/142; H04L 41/147; H04L 41/16; H04L 41/0823; H04L 41/5009; H04L 43/08; H04W 24/04; H04W 24/08
See application file for complete search history.

(56) References Cited

U.S. PATENT DOCUMENTS

| | | |
|---|---|---|
| 2016/0088006 A1 | 3/2016 | Gupta et al. |
| 2017/0339022 A1 | 11/2017 | Hegde et al. |
| 2018/0019910 A1* | 1/2018 | Tsagkaris ............ H04B 7/04 |

OTHER PUBLICATIONS

Extended European Search Report in EP Appln. No. 19161963.4, dated Jul. 12, 2019, 8 pages.

* cited by examiner

*Primary Examiner* — Khoa Huynh
(74) *Attorney, Agent, or Firm* — Fish & Richardson P.C.

(57) ABSTRACT

Methods, systems, and apparatus, including computer programs encoded on a computer storage medium, for telecommunications network troubleshooting. In one aspect, a method includes obtaining multiple current observations characterizing current operation of a telecommunications network, the multiple observations including performance monitoring data for the network and quality of service data for the network. One or more prior network states for the network are obtained. A current state of the network is determined, by a machine learning model, based on the current observations and the one or more prior network states. One or more actions are performed based on the current state of the network, including, when the current state of the network is an abnormal state, taking an action that is mapped to the abnormal state.

14 Claims, 3 Drawing Sheets

TELECOMMUNICATIONS NETWORK TROUBLESHOOTING SYSTEMS

BACKGROUND

This specification relates to telecommunications network troubleshooting systems.

Telecommunications network troubleshooting systems can process data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes devices, systems, and methods, which can be implemented as computer programs on one or more computers in one or more locations, that perform telecommunications network troubleshooting.

According to a first aspect there is provided a method for performing telecommunications network troubleshooting, the method including obtaining, by one or more data processors, multiple current observations characterizing current operation of a telecommunications network, the multiple observations including performance monitoring data for the network and quality of service data for the network. One or more prior network states for the network are obtained by the one or more data processors. A current state of the network is determined, by a machine learning model, based on the current observations and the one or more prior network states, including processing the current observations in accordance with current values of a set of machine learning model parameters. The current state of the network is logged, by the one or more data processors, as an additional state of the one or more prior network states. One or more actions are performed, by the one or more processors, based on the current state of the network, including, when the current state of the network is an abnormal state, taking an action that is mapped to the abnormal state.

In some implementations, the method further includes obtaining, by the one or more data processors, multiple new observations characterizing operation of the network after performing the one or more actions, the multiple new observations including performance monitoring data and quality of service data for the network after performing the one or more actions; obtaining, by the one or more data processors, one or more network states of the network prior to having performed the one or more actions; determining, by the machine learning model, a new state of the network based on the new observations and the one or more network states prior to having performed the one or more actions, including processing the new observations and the one or more network states prior to having performed the one or more actions in accordance with the current values of the set of machine learning model parameters; logging, by the one or more data processors, the new state of the network; performing, by the one or more processors, one or more new actions based on the new state of the network, including, when the new state of the network is an abnormal state, taking a new action that is mapped to the abnormal state.

In some implementations, determining, by the machine learning model, the current state of the network comprises: processing the current observations in accordance with the current values of the set of machine learning model parameters to generate an output indicating the current state of the network; and normalizing the current state of the network based on the one or more prior states of the network.

In some implementations, the output of the machine learning model indicates the current state of the network is a given abnormal state; and the normalized current state of the network is a normal state, the method further comprising: preventing an action that is mapped to the given abnormal state from being performed based on the normalized current state of the network being the normal state.

In some implementations, determining, by the machine learning model, the current state of the network comprises: obtaining, by the one or more data processors, prior observations characterizing prior operation of the network; and jointly processing the prior observations and the current observations in accordance with the current values of the set of machine learning model parameters to generate an output indicating the current state of the network.

In some implementations, the method further includes verifying that the current state of the network determined by the machine learning model is accurate; updating a training data set by logging in the training data set, by the one or more data processors, a training example comprising: (i) the current observations, and (ii) the current state of the network determined by the machine learning model; and adjusting the current values of the set of machine learning model parameters based on the updated training data set using a machine learning training technique.

In some implementations, the method further includes: updating a training data set by logging in the training data set, by the one or more data processors, a training example that includes the current observations but excludes the current state of the network, and adjusting the current values of the set of machine learning model parameters based on the updated training data set using a machine learning training technique.

In some implementations, the machine learning model is trained based on a training data set including multiple training examples, wherein one or more of the training examples include: (i) prior observations characterizing operation of a baseline telecommunications network at a respective prior time, and (ii) a corresponding prior state of the baseline network at the respective prior time, and wherein the baseline network is different than the network.

In some implementations, determining the current state of the network comprises determining that the current state of the network is a normal operation state, the method further comprising: determining, based on an output of the machine learning model, that a future state of the network is predicted to be an abnormal state in the future; and outputting an alert specifying that the future state of the network is predicted to be the abnormal state in the future.

According to a second aspect, there is provided a system comprising a data processing apparatus and a non-transitory memory storage in data communication with the data processing apparatus and storing instructions executable by the data processing apparatus and that upon such execution cause the data processing apparatus to perform operations comprising the operations of the method for performing telecommunications network troubleshooting.

According to a third aspect, there is provided a non-transitory computer storage medium storing instructions executable by a data processing apparatus and that upon such execution cause the data processing apparatus to perform operations comprising the operations of the method for performing telecommunications network troubleshooting.

Particular embodiments of the subject matter described in this specification can be implemented so as to realize one or more of the following advantages.

The troubleshooting system as described in this specification can detect and resolve network problems without requiring explicit programming specific to any particular network problem. In contrast, some conventional troubleshooting systems include specific programming for different variations of particular network problems. Therefore, these conventional systems require manual intervention and modification as new variations of known network problems present themselves. The troubleshooting system as described in this specification can automatically generalize to different variations of known network problems without manual intervention, and can generalize to new network problems simply by processing sufficient quantities of training data related to the new network problems. Therefore, the troubleshooting system as described in this specification is more flexible and requires less manual intervention than some conventional troubleshooting systems.

The troubleshooting system as described in this specification can seamlessly process vast quantities of network data to identify complex correlations in the data that enable it to outperform conventional troubleshooting systems by more accurately detecting network problems and more effectively resolving them. For example, humans performing manual troubleshooting are unable to process and interpret the quantities of network data that are processed by the troubleshooting system as described in this specification, and therefore may be unable to match the performance of the troubleshooting system as described in this specification. As another example, conventional troubleshooting systems that are specifically programmed to detect and resolve network problems based on predetermined criteria may underperform the troubleshooting system as described in this specification because they lack the flexibility to learn to detect and resolve network problems directly from network data.

The troubleshooting system as described in this specification includes a machine learning model that can be trained using both labelled training examples and unlabeled training examples. In the present application, a labelled training example refers to a training example including both: (i) observations characterizing operation of a network at a respective time point, and (ii) a network state of the network at the respective time point, whereas an unlabeled training example includes only observations characterizing operation of a network at a respective time point. While generating labelled training examples is time-consuming, expensive, and difficult, unlabeled training examples are plentiful. Therefore, the troubleshooting system as described in this specification enables more efficient resource usage than systems that rely only on labelled training examples, since it can exploit plentiful unlabeled training examples to improve troubleshooting performance.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
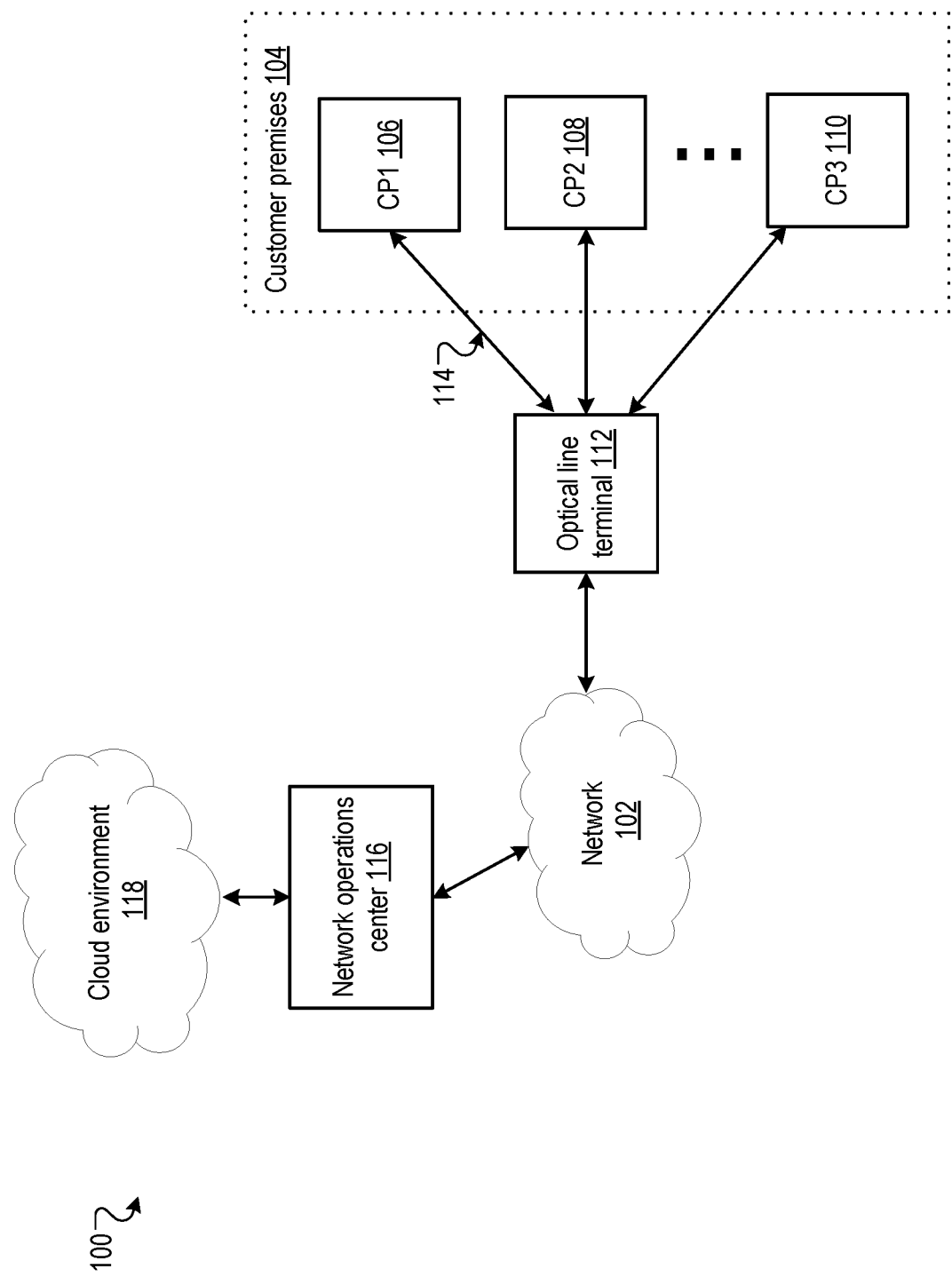
FIG. 1 is a block diagram of an example environment including a telecommunications network.

This document discloses methods, systems, apparatus, and computer readable media for performing telecommunications network troubleshooting.

Generally, a telecommunications network includes a system of nodes connected by transmission links that enables the transfer of data between multiple users. Transmission links enable transmission of data (e.g., text, images, audio, or any form of data) between nodes. Examples of transmission links include wire links, fiber-optic cable links, radio wave links, and any other link that enables any kind of communication through electromagnetic waves. A node includes hardware, software, or both that implements methods for routing data between nodes (e.g., circuit switching, message switching, or packet switching) to enable the transmission of data to particular destinations (e.g., a user device connected to a node by a transmission link). Examples of telecommunications networks include local area networks (LANs), wide area networks (WANs), telephone networks, or a combination thereof.

Troubleshooting a telecommunications network refers to detecting and resolving problems that affect the network. In general, a problem affecting the network is anything that causes a measure of network performance to fall outside an acceptable range. For example, a network performance measure may be the fraction of network users who are experiencing at least a threshold network data bandwidth, and an acceptable range may be any data bandwidth greater than 1 Mbps (or any other appropriate bandwidth threshold).

Examples of problems that can affect networks are hardware failures (e.g., damaged hardware components), hardware malfunctions (e.g., rogue optical network terminals), interoperability issues (e.g., when different network components do not communicate properly), power disruptions (e.g., when components in parts of the network infrastructure do not receive sufficient power), and excess network traffic (e.g., when the quantity of data transmitted over the network exceeds network capacity).

Examples of resolving problems that affect networks are: dispatching technicians to replace hardware components, providing software patches to facilitate communication between network components, notifying appropriate authorities of power disruptions, reconfiguring portions of the network to increase network capacity, and optimizing network links to increase network capacity.

This specification describes troubleshooting systems and methods for troubleshooting telecommunications networks. As will be described in more detail below, the system obtains observations characterizing current operation of a network (e.g., performance monitoring data and quality of service data), processes the observations in accordance with current parameters values of a machine learning model to generate an output indicating a current state of the network (e.g., detecting that one or more problems are affecting the network), and performs one or more actions based on the current state of the network (e.g., to resolve the problem).

FIG. 1 is a block diagram of an example environment 100 including a telecommunications network 102. The telecommunications network 102 may be a LAN, a WAN, a telephone network, or a combination thereof.

The example environment 100 includes customer premises 104, e.g., CP1 106, CP2 108, and CP3 110, which could be, for example, residential or commercial premises. Users located at the customer premises 104 transmit and/or receive data over the network 102 using user devices such as telephones, televisions, computers, or any other appropriate device. Each of the customer premises includes an optical network terminal (ONT) that is connected to an optical line terminal (OLT) 112 by a fiber-optic cable link (e.g., the fiber-optic cable link 114). ONTs can perform operations including demultiplexing (i.e., separating) different components (e.g., television data, telephone voice data, and Internet data) of optical signals transmitted to customer premises over the network 102.

The OLT 112 can perform operations including converting data transmitted over the network 102 from an electrical signal (or any other kind of signal) to an optical signal and multiplexing (i.e., combining) different signal components for transmission over a fiber-optic cable link to the customer premises 104.

The network operations center 116 includes one or more locations from which a network operator (e.g., an Internet service provider) manages operation of the network 102. Managing the operation of a network can include troubleshooting the network (for example, using the troubleshooting system as described in this specification), as well as other functions such as providing customer support (e.g., to network users located at customer premises 104) and billing customers for usage of the network.

The environment 100 includes a cloud environment 118 which provides remote access (e.g., over the Internet) to computing resources (e.g., memory and processing resources). The network operations center 116 may store and/or process data in the cloud environment 118.

The troubleshooting system as described in this specification may be implemented using hardware and/or software components that are located in the cloud environment 118, the network operations center 116, the OLT 112, a combination thereof, or any other appropriate location.

Figure 2:
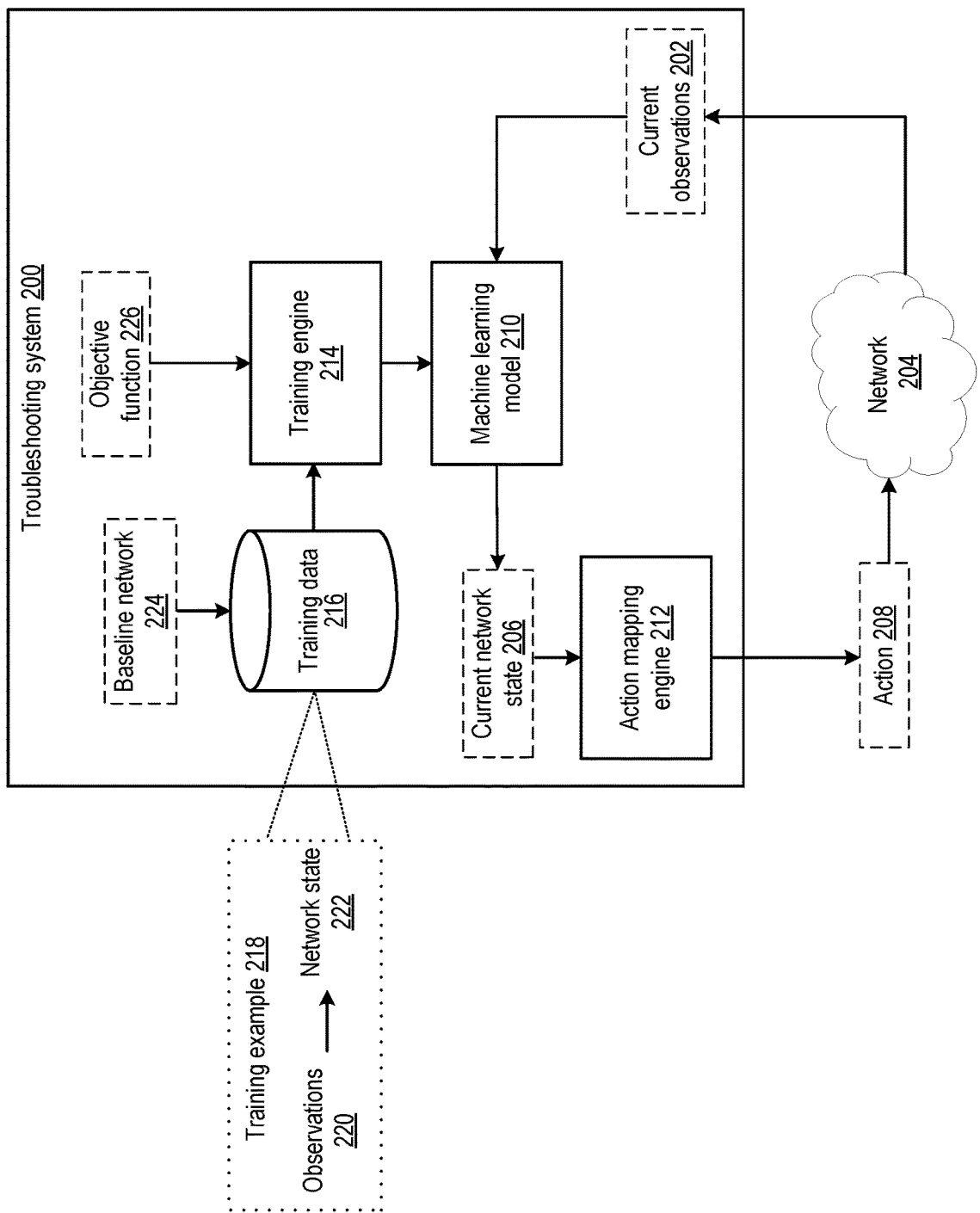
FIG. 2 shows an example telecommunications network troubleshooting system.

FIG. 2 shows an example troubleshooting system 200. The troubleshooting system 200 is an example of a system implemented as computer programs on one or more computers in one or more locations in which the systems, components, and techniques described below are implemented.

The troubleshooting system 200 is configured to, at each of one or more time steps, process current observations 202 of a network 204 to determine a current network state 206, and based on the current network state 206, perform one or more actions 208. In general, the network 204 can be any telecommunications network, for example, a LAN, a WAN, a telephone network, or a combination thereof.

The current observations 202 are data (e.g., represented as numerical data) that characterize current operation of the network 204. For example, the current observations 202 may include performance monitoring data, quality of service data, alarm data, configuration data, or any other kind of data that characterizes the operation of the network 204. Quality of service data can include data characterizing packet loss, transmission delay, availability, jitter, or any combination thereof. Performance monitoring data can include data characterizing bit rate and throughput (e.g., at the byte or packet level) over any appropriate time scale.

Alarm data can include data indicating abnormal operation of the network 204, such as data indicating that network components are functioning abnormally (e.g., overheating) or that network facilities are functioning abnormally (e.g., as indicated by a fire alarm). Configuration data can include data characterizing device configuration (e.g., relating to circuits, switching, and/or routing), interface configuration (e.g., relating to operation of physical layer technology), and service level configuration (e.g., relating to deployment of services across the network 204).

The system 200 provides an input including a numerical representation (e.g., as a vector or a matrix) of the current observations 202 to a machine learning model 210 that is configured to process the input in accordance with current parameter values of the machine learning model 210 to generate as output data indicating a current network state 206. The machine learning model 210 can be a neural network (e.g., a feed-forward neural network or a recurrent neural network), a random forest, a support vector machine, a linear regression model, a nearest-neighbor model, or any other appropriate machine learning model (or combination of machine learning models). The current network state 206 can be a normal state, an abnormal state, or an anomalous state.

In some cases, a normal state refers to a network state where a measure of network performance is within an acceptable range according to some network performance measure. For example, the network performance measure may be the fraction of network users who are experiencing at least a threshold network data bandwidth.

In some cases, an abnormal state refers to a network state where a measure of network performance is outside of an acceptable range because of one or more problems affecting the network. Different abnormal states may be associated with different combinations of one or more network problems. Examples of network problems include hardware failures, interoperability issues, power disruptions, and excess network traffic.

In some cases, an anomalous state refers to a network state where network performance is within an acceptable range, but one or more characteristics of the operation of the network are unusual. For example, one or more parameters of the current observations (e.g., the current packet loss) may be unusually high or low relative to previous observations.

The current network state 206 may be represented in any appropriate numerical representation. For example, the current network state 206 may be represented as a one-hot vector (i.e., a vector with a different entry for each possible network state, where the entry corresponding to the current network state has value 1, and the entries corresponding to the other network states have value 0).

The system 200 normalizes the current network state 206 output by the machine learning model 210 based on one or more prior network states (e.g., as determined by the system 200 at previous time steps), as will be described in more detail later. By normalizing the current network state 206 based on one or more prior network states, the system 200 stabilizes the prediction for the current network state 206. For example, by normalizing the current network state 206 based on one or more prior network states, transient variations in the values of the current observations 202 (caused, for example, by noisy measurements of network parameters rather than by actual problems affecting the network 204) are less likely to result in the system 200 determining that the current network state 206 is an abnormal state or an anomalous state.

The system 200 provides the current network state 206 as input to an action mapping engine 212 that is configured to map the current network state 206 to one or more actions 208 to be performed based on the current network state 206. As will be described in more detail later, the action mapping engine 212 can map the current network state 206 to one or more actions 208 based on a predetermined mapping relationship or based on a dynamic mapping relationship determined by machine learning techniques such as reinforcement learning.

The actions 208 may be any appropriate actions to be performed in response to the current network state 206. For example, if the current network state 206 is an abnormal state, then the actions 208 may be actions to resolve problems affecting the network 204 in the current network state 206, so that performing the actions causes the network 204 to revert to a normal state. As another example, if the current network state 206 is a normal network state that is further defined by a prediction that a future network state will be a given abnormal state, then the actions 208 may include outputting an alert (e.g., to a network operator) indicating that a future state of the network 204 is predicted to be the given abnormal state. As another example, if the current network state 206 is an anomalous network state, then the actions 208 may include outputting at an alert indicating that the operation of the network 204 is unusual.

The system 200 includes a training engine 214 that is configured to train the machine learning model 210 based on training data 216. The training data 216 includes multiple training examples, including labelled training examples 218, and in some cases, additional unlabeled training examples. A labelled training example 218 includes: (i) observations 220 characterizing operation of a network at a respective time step, and (ii) a network state 222 of the network at the respective time step (i.e., a label). An unlabeled training example includes observations characterizing operation of a network at a respective time step, but does not include the network state of the network at the respective time step.

The system 200 can harvest (i.e., collect) the training data 216 from one or more baseline telecommunications networks 224 and/or from the network 204. Each baseline network 204 may be a real or simulated telecommunications network. In some cases, each of the baseline networks 224 has similar network characteristics (e.g., network topology, network data flow patterns, network infrastructure, and the like) to the network 204. In some cases, the baseline networks 224 have a variety of different network characteristics (including some with network characteristics that are different than the network 204), so that by training the machine learning model 210 on the training data 216, the system 200 can be applied to troubleshoot different networks with different network characteristics.

In some implementations, the system 200 harvests training data from a baseline network 204 by dynamically affecting the operation of the baseline network 204. For example, the system 200 may harvest training data by actively causing the network state of the baseline network 204 to become abnormal (e.g., by actively causing the baseline network 204 to experience one or more problems), and logging labelled training examples 218 in the training data 216 including: (i) observations characterizing the operation of the baseline network 204, and (ii) the actively caused abnormal state of the baseline network 204.

In some implementations, the system 200 harvests training data from a baseline network 204 based on historical (i.e., past) data characterizing past operation of the baseline network 204. For example, the system 200 may identify previous times when the network state of the baseline network 204 was abnormal (for example, based on historical troubleshooting tickets generated by a network operator), and log labelled training examples 218 in the training data 216 including: (i) historical observations characterizing operation of the baseline network 204, and (ii) corresponding abnormal states of the baseline network 204 (for example, as characterized by historical troubleshooting tickets).

In some implementations, the system 200 harvests training data directly from the network 204. For example, the system 200 may verify (e.g., by a human rater) that a current network state 222 determined by the machine learning model 210 is accurate, and log a labelled training example 218 in the training data 216 including: (i) the current observations 202 characterizing current operation of the network 204, and (ii) the verified current network state of the network 204. As another example, the system may log an unlabeled training example in the training data 216 including the current observations 202 characterizing current operation of the network 204 (but without data indicating the current network state 222).

The operation of the training engine 214 depends on the machine learning model 210. In some implementations (for example, if the machine learning model 210 is a k-nearest neighbor machine learning model), the training engine may provide the training data 216 directly to the machine learning model 210. In some other implementations (for example if the machine learning model 210 is a random forest or a neural network), the training engine 214 may train the machine learning model 210 based on the training data 216 by adjusting the parameter values of the machine learning model to optimize an objective function 226 (e.g., a cross-entropy loss function). By adjusting the parameter values of the machine learning model 210 to optimize the objective function 226, the training engine 214 improves the prediction performance of the machine learning model 210 (i.e., the capacity of the machine learning model 210 to accurately predict the current network state 222 based on the current observations 202).

In some cases, the training engine 214 trains the machine learning model 210 using supervised learning techniques based on labelled training examples from the training data 216. In some cases, the training engine 214 trains the machine learning model 210 using semi-supervised learning techniques, based on both labelled training examples and unlabeled training examples in the training data 216.

The training engine 214 may adaptively train the machine learning model 210 during operation of the system 200. For example, the system 200 may augment the training data 216 by logging new training examples (either labelled or unlabeled) harvested from the baseline networks 224 or the network 204, and train the machine learning model 210 based on the augmented training data.

Figure 3:
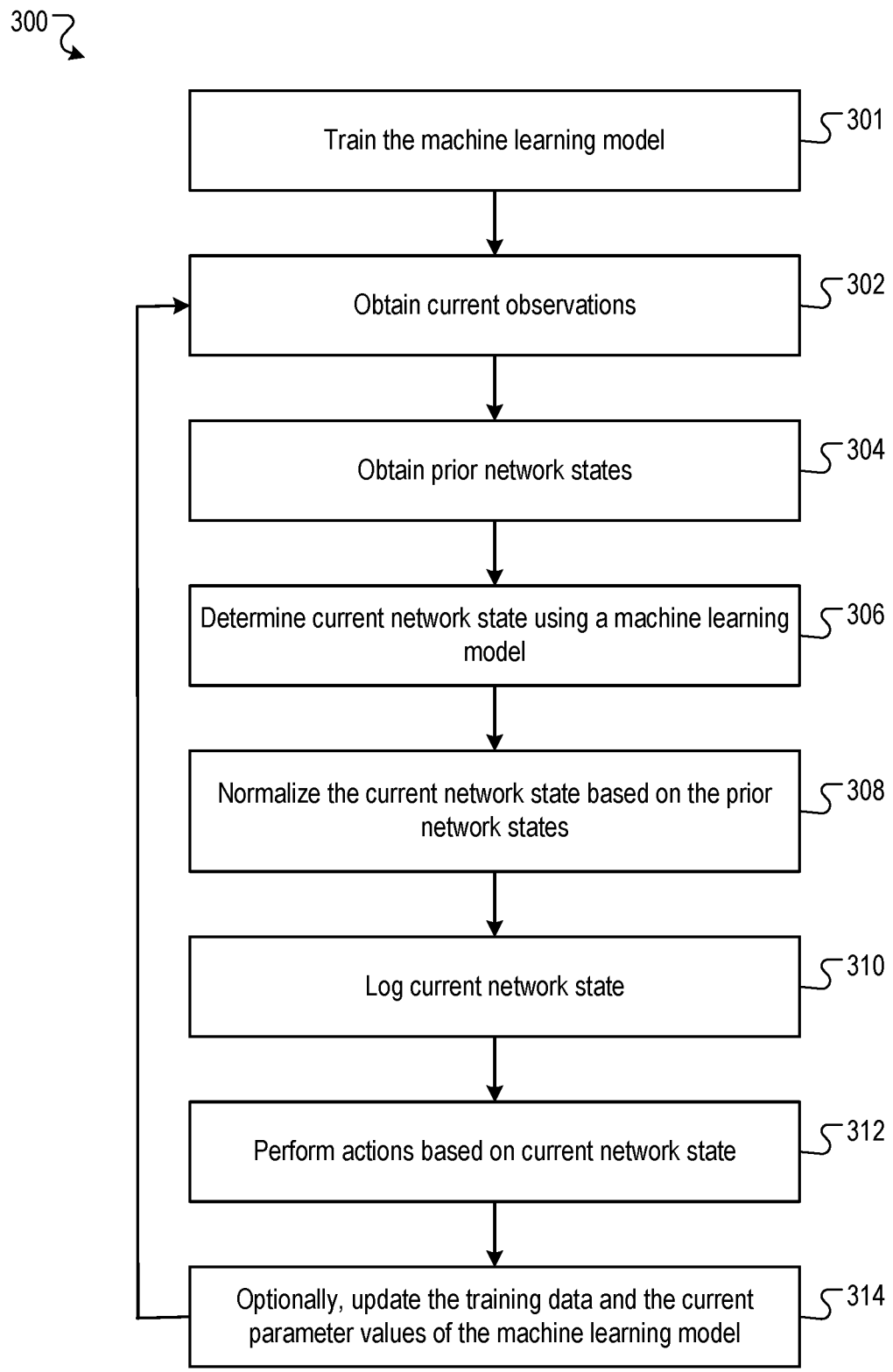
FIG. 3 is a flow diagram of an example process for troubleshooting a telecommunications network.

FIG. 3 is a flow diagram of an example process for troubleshooting a telecommunications network. Generally, the process 300 is repeated at each of multiple time steps. For convenience, the process 300 will be described as being performed by a system of one or more computers located in one or more locations. For example, a troubleshooting system, e.g., the troubleshooting system 200 of FIG. 2, appropriately programmed in accordance with this specification, can perform the process 300.

The system trains the machine learning model based on a set of training data (301). The training data includes multiple training examples, including labelled training examples, and in some cases, additional unlabeled training examples. A labelled training example includes: (i) observations characterizing operation of a network at a respective time step, and (ii) a network state of the network at the respective time step (i.e., a label). An unlabeled training example includes observations characterizing operation of a network at a respective time step, but does not include the network state of the network at the respective time step.

The system can harvest the training data from one or more baseline telecommunications networks. Each baseline network may be a real or simulated telecommunications network. In some cases, each of the baseline networks has similar network characteristics (e.g., network topology, network data flow patterns, network infrastructure, and the like) to the network. In some cases, the baseline networks have a variety of different network characteristics (including some with network characteristics that are different than the network), so that by training the machine learning model on the training data, the system can be applied to troubleshoot different networks with different network characteristics.

In some implementations, the system harvests training data from a baseline network by dynamically affecting the operation of the baseline network. For example, the system may harvest training data by actively causing the network state of the baseline network to become abnormal (e.g., by actively causing the baseline network to experience one or more problems), and logging labelled training examples in the training data including: (i) observations characterizing the operation of the baseline network, and (ii) the actively caused abnormal state of the baseline network.

In some implementations, the system harvests training data from a baseline network based on historical (i.e., past) data characterizing past operation of the baseline network. For example, the system may identify previous times when the network state of the baseline network was abnormal (for example, based on historical troubleshooting tickets generated by a network operator), and log labelled training examples in the training data including: (i) historical observations characterizing operation of the baseline network, and (ii) corresponding abnormal states of the baseline network (for example, as characterized by historical troubleshooting tickets).

In some implementations (for example, if the machine learning model is a k-nearest neighbor machine learning model), the system may provide the training data directly to the machine learning model. In some other implementations (for example if the machine learning model is a random forest or a neural network), the training engine may train the machine learning model based on the training data by adjusting the parameter values of the machine learning model to optimize an objective function (e.g., a cross-entropy loss function). By adjusting the parameter values of the machine learning model to optimize the objective function, the training engine improves the prediction performance of the machine learning model (i.e., the capacity of the machine learning model to accurately predict the current network state based on the current observations).

The system obtains current observations that characterize current operation of the network (302). For example, the current observations may include performance monitoring data, quality of service data, alarm data, configuration data, or any other kind of data that characterizes the operation of the network. Quality of service data can include data characterizing packet loss, transmission delay, availability, jitter, or any combination thereof. Performance monitoring data can include data characterizing bit rate and throughput (e.g., at the byte or packet level) over any appropriate time scale. Alarm data can include data indicating abnormal operation of the network, such as data indicating that network components are functioning abnormally (e.g., overheating) or that network facilities are functioning abnormally (e.g., as indicated by a fire alarm). Configuration data can include data characterizing the deployment of resources across the network.

The system obtains data indicating one or more prior network states (i.e., states of the network at one or more previous time steps) (304). In some cases, the system stores the data indicating the prior network states in a logical data storage area or a physical data storage device, and obtaining the data indicating the prior network states corresponds to retrieving the data from its storage location. The system can represent each of the prior network states in any appropriate format, for example, as a one-hot vector (i.e., a vector with a different entry for each possible network state, where the entry corresponding to the prior network state has value 1, and the entries corresponding to the other network states have value 0).

The system determines the current network state using a machine learning model (306). The machine learning model can be a neural network (e.g., a feed-forward neural network or a recurrent neural network), a random forest, a support vector machine, a linear regression model, a nearest-neighbor model, or any other appropriate machine learning model (or combination of machine learning models).

The system provides an input including a numerical representation (e.g., as a vector or a matrix) of the current observations (i.e., obtained in 302) to the machine learning model, which is configured to process the input in accordance with current parameter values of the machine learning model to generate as output data indicating the current network state. Optionally, to stabilize the machine learning model's estimate of the current network state, the system may additionally provide observations of the network from one or more prior time points as input to the machine learning model, in addition to the current observations.

The current network state can be a normal state, an abnormal state, or an anomalous state.

In some cases, a normal state refers to a network state where a measure of network performance is within an acceptable range according to some network performance measure. For example, the network performance measure may be the fraction of network users who are experiencing at least a threshold network data bandwidth. In some cases, a normal state (i.e., as output by the machine learning model) may be further defined by a prediction that a future state of the network (i.e., at a future time step) will be an abnormal state.

An abnormal state refers to a network state where a measure of network performance is outside of an acceptable range because of one or more problems affecting the network. Different abnormal states may be associated with different combinations of one or more network problems. Examples of network problems include hardware failures, interoperability issues, power disruptions, and excess network traffic.

An anomalous state refers to a network state where network performance is within an acceptable range, but one or more characteristics of the operation of the network are unusual. For example, one or more parameters of the current observations (e.g., the current packet loss) may be unusually high or low relative to previous observations.

Similar to the prior network states (as described in 304), the current network state may be represented by any appropriate numerical representation.

The system normalizes the current network state (i.e., as determined in 306) using the obtained prior network states (308). Specifically, the system normalizes the current network state by combining the current network state and the prior network states.

In some implementations, the system may assign the current network state and the prior network states voting weights, and determine the normalized current network state to be the network state with a highest sum of votes. In a particular example, the possible network states are A and B, the current network state output by the machine learning model is A, the prior network states at the four previous time steps are B, B, B, and A, and the current network state output by the machine learning model and each of the prior network states are assigned an equal voting weight of one. Then the sum of votes for network state A is two, and the sum of votes for network state B is three, and therefore the normalized current network state is determined to be B.

In some of these implementations, the current network state output by the machine learning model and the prior network states may be assigned voting weights so that: (i) the voting weights are equal (i.e., a majority voting algorithm), (ii) the voting weights are unequal where the voting weight of the current network state output by the machine learning model is greater than the voting weights of the prior network states, (iii) the voting weights are treated are system hyper-parameters that are optimized by a cross-validation procedure, (iv) the voting weights are treated as learnable system parameters that are optimized by the training engine based on the objective function, (v) the voting weights for the prior network states decrease exponentially as the amount of time between the prior network state and the current network state increases, (vi) the voting weights depend on external information (e.g., actions performed at previous time steps), or (vii) the voting weights for the prior network states depend on an expectation of how accurately the prior network states indicate the current network state.

In some cases, the current network state output by the machine learning model may be a given abnormal state, while the normalized current network state is a normal state. For example, the current network state output by the machine learning model may be the given abnormal state because the current network observations indicate that one or more problems may be affecting the network. However, actions may have been performed by the system at previous time steps to resolve the problems affecting the network, although the effects of these actions may take multiple time steps to propagate through the network and take effect. In this example, based on the prior network states and the prior actions performed by the system, the system may determine the normalized current network state to be a normal state. In these cases, the system prevents actions that are mapped to the given abnormal state from being performed (i.e., as described in 312) based on the normalized current network state being a normal state.

In some cases, the system does not normalize the current network state by combining the current network state and the prior network states, and rather maintains the current network state output by the machine learning model (i.e., as described in 306).

The system logs the current network state (310). For example, the system may store the current network state in the in the logical data storage area or physical data storage device used to store the prior network states.

The system maps the current network state to one or more actions and performs the actions (312). The actions may be any appropriate actions to be performed in response to the current network state. For example, if the current network state is an abnormal state, then the actions may be actions to resolve problems affecting the network in the current network state, so that performing the actions causes the network to revert to a normal state. As another example, if the current network state is a normal network state that is further defined by a prediction that a future network state will be a given abnormal state, then the actions may include outputting an alert (e.g., to a network operator) indicating that a future state of the network is predicted to be the given abnormal state in the future. As another example, if the current network state is an anomalous network state, then the actions may include outputting at an alert indicating that the operation of the network is unusual. As another example, if the current network state is a normal state, then the action may be a null action that has no effect (i.e., the system does not perform any action).

Further examples of actions that the system may perform include dispatching technicians to replace hardware components, providing software patches to facilitate communication between network components, notifying appropriate authorities of power disruptions, and reconfiguring portions of the network to increase network capacity.

In some implementations, the system maps the current network state to one or more actions based on a fixed, predetermined mapping. In some other implementations, the system maps the current network state to one or more actions based on a mapping dynamically determined by a machine learning method. For example, the system may dynamically update the mapping using reinforcement learning methods. Specifically, the system may receive rewards based on whether selected actions cause the network state to revert to a normal state, thereby enabling the system to dynamically learn how to map different network states to optimal actions to be performed in response to the different network states.

In some cases, the system normalizes the determined actions based on prior actions (e.g., as performed by the system at previous time steps) to reduce the likelihood of the same actions being redundantly performed multiple times to resolve a network problem.

Optionally, the system may update the training data by logging a new training example including: (i) the current network observations, and in some cases, (ii) the current network state, and adaptively train the machine learning model by adjusting the current values of the set of machine learning model parameters based on the updated training data using supervised or semi-supervised learning methods (as described earlier) (314).

In some implementations, the system verifies (e.g., by a human rater) that a current network state determined by the machine learning model is accurate, and updates the training data set by logging a labelled training example in the training data including: (i) the current observations characterizing current operation of the network, and (ii) the verified current network state of the network. In some implementations, the system updates the training data set by logging an unlabeled training example in the training data including the current observations characterizing current operation of the network (but excluding data indicating the current network state).

At the next time step, the system returns to 302 and repeats the preceding steps. Specifically, the system obtains multiple new observations characterizing operation of the network after performing the one or more actions, the multiple new observations including performance monitoring data and quality of service data for the network after performing the one or more actions (as in 302). The system obtains one or more network states of the network prior to having performed the one or more actions (as in 304). The system determines, by the machine learning model, a new state of the network based on the new observations and the one or more network states prior to having performed the one or more actions, including processing the new observations and the one or more network states prior to having performed the one or more actions in accordance with the current values of the set of machine learning model parameters (as in 306). The system logs the new state of the network (as in 310) and performs one or more new actions based on the new state of the network, including, when the new state of the network is an abnormal state, taking a new action that is mapped to the abnormal state (as in 312).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   obtaining, by one or more data processors, multiple current observations characterizing current operation of a telecommunications network, the multiple observations including performance monitoring data for the network and quality of service data for the network;
   obtaining, by the one or more data processors, one or more prior network states for the network;
   determining, by the one or more data processors and using a machine learning model, a current state of the network based on the current observations and the one or more prior network states, including:
      processing the current observations in accordance with current values of a set of machine learning model parameters to generate an output indicating the current state of the network, wherein the output of the machine learning model indicates that the current state of the network is an abnormal state;
   logging, by the one or more data processors, the current state of the network as an additional state of the one or more prior network states; and
   performing, by the one or more processors, one or more actions based on the current state of the network, including, when the current state of the network is an abnormal state, taking an action that is mapped to the abnormal state, wherein taking an action that is mapped to the abnormal state comprises:
      normalizing the current state of the network based on the one or more prior network states to generate a normalized current state of the network, wherein the normalized current state of the network is a normal state; and
      preventing, by the one or more processors, an action that is mapped to the abnormal state from being performed based on the normalized current state of the network being the normal state.

2. The method of claim 1, further comprising:
   obtaining, by the one or more data processors, multiple new observations characterizing operation of the network after performing the one or more actions, the multiple new observations including performance monitoring data and quality of service data for the network after performing the one or more actions;
   obtaining, by the one or more data processors, one or more network states of the network prior to having performed the one or more actions;

determining, by the one or more data processors and using the machine learning model, a new state of the network based on the new observations and the one or more network states prior to having performed the one or more actions, including processing the new observations and the one or more network states prior to having performed the one or more actions in accordance with the current values of the set of machine learning model parameters;

logging, by the one or more data processors, the new state of the network;

performing, by the one or more data processors, one or more new actions based on the new state of the network, including, when the new state of the network is an abnormal state, taking a new action that is mapped to the abnormal state.

3. The method of claim 1, wherein determining, using the machine learning model, the current state of the network comprises:

obtaining, by the one or more data processors, prior observations characterizing prior operation of the network; and jointly processing the prior observations and the current observations in accordance with the current values of the set of machine learning model parameters to generate the output indicating the current state of the network.

4. The method of claim 1, further comprising:

verifying that the current state of the network determined using the machine learning model is accurate;

updating a training data set by logging in the training data set, by the one or more data processors, a training example comprising: (i) the current observations, and (ii) the current state of the network determined using the machine learning model; and adjusting the current values of the set of machine learning model parameters based on the updated training data set using a machine learning training technique.

5. The method of claim 1, further comprising:

updating a training data set by logging in the training data set, by the one or more data processors, a training example that includes the current observations but excludes the current state of the network, and adjusting the current values of the set of machine learning model parameters based on the updated training data set using a machine learning training technique.

6. The method of claim 1, wherein the machine learning model is trained based on a training data set including multiple training examples, wherein one or more of the training examples include: (i) prior observations characterizing operation of a baseline telecommunications network at a respective prior time, and (ii) a corresponding prior state of the baseline network at the respective prior time, and wherein the baseline network is different than the network.

7. The method of claim 1, further comprising:

determining, based on the output of the machine learning model, that a future state of the network is predicted to be a particular abnormal state in the future; and outputting an alert specifying that the future state of the network is predicted to be the particular abnormal state in the future.

8. A system, comprising:

one or more data processors;

a non-transitory memory storage in data communication with the one or more data processors and storing instructions executable by the one or more data processors and that upon such execution cause the one or more data processors to perform operations comprising:

obtaining multiple current observations characterizing current operation of a telecommunications network, the multiple observations including performance monitoring data for the network and quality of service data for the network;

obtaining one or more prior network states for the network;

determining, using a machine learning model, a current state of the network based on the current observations and the one or more prior network states, including:

processing the current observations in accordance with current values of a set of machine learning model parameters to generate an output indicating the current state of the network, wherein the output of the machine learning model indicates that the current state of the network is an abnormal state;

logging the current state of the network as an additional state of the one or more prior network states; and performing one or more actions based on the current state of the network, including, when the current state of the network is an abnormal state, taking an action that is mapped to the abnormal state, wherein taking an action that is mapped to the abnormal state comprises:

normalizing the current state of the network based on the one or more prior network states to generate a normalized current state of the network, wherein the normalized current state of the network is a normal state; and preventing, by the one or more processors, an action that is mapped to the abnormal state from being performed based on the normalized current state of the network being the normal state.

9. The system of claim 8, wherein the execution causes the one or more data processors to perform operations further comprising:

obtaining multiple new observations characterizing operation of the network after performing the one or more actions, the multiple new observations including performance monitoring data and quality of service data for the network after performing the one or more actions;

obtaining one or more network states of the network prior to having performed the one or more actions;

determining, using the machine learning model, a new state of the network based on the new observations and the one or more network states prior to having performed the one or more actions, including processing the new observations and the one or more network states prior to having performed the one or more actions in accordance with the current values of the set of machine learning model parameters;

logging the new state of the network;

performing one or more new actions based on the new state of the network, including, when the new state of the network is an abnormal state, taking a new action that is mapped to the abnormal state.

10. The system of claim 8, wherein determining, using the machine learning model, the current state of the network comprises:

obtaining prior observations characterizing prior operation of the network; and jointly processing the prior observations and the current observations in accordance with the current values of the set of machine learning model parameters to generate the output indicating the current state of the network.

11. A non-transitory computer storage medium storing instructions executable by one or more data processors and that upon such execution cause the one or more data processors to perform operations comprising:

obtaining multiple current observations characterizing current operation of a telecommunications network, the multiple observations including performance monitoring data for the network and quality of service data for the network;

obtaining one or more prior network states for the network;

determining, using a machine learning model, a current state of the network based on the current observations and the one or more prior network states, including:
processing the current observations in accordance with current values of a set of machine learning model parameters to generate an output indicating the current state of the network, wherein the output of the machine learning model indicates that the current state of the network is an abnormal state;

logging the current state of the network as an additional state of the one or more prior network states; and performing one or more actions based on the current state of the network, including, when the current state of the network is an abnormal state, taking an action that is mapped to the abnormal state, wherein taking an action that is mapped to the abnormal state comprises:
normalizing the current state of the network based on the one or more prior network states to generate a normalized current state of the network, wherein the normalized current state of the network is a normal state; and
preventing, by the one or more processors, an action that is mapped to the abnormal state from being performed based on the normalized current state of the network being the normal state.

12. The non-transitory computer storage medium of claim 11, wherein the execution causes the one or more data processors to perform further operations comprising:

obtaining multiple new observations characterizing operation of the network after performing the one or more actions, the multiple new observations including performance monitoring data and quality of service data for the network after performing the one or more actions;

obtaining one or more network states of the network prior to having performed the one or more actions;

determining, using the machine learning model, a new state of the network based on the new observations and the one or more network states prior to having performed the one or more actions, including processing the new observations and the one or more network states prior to having performed the one or more actions in accordance with the current values of the set of machine learning model parameters;

logging the new state of the network;

performing one or more new actions based on the new state of the network, including, when the new state of the network is an abnormal state, taking a new action that is mapped to the abnormal state.

13. The non-transitory computer storage medium of claim 11, wherein determining, using the machine learning model, the current state of the network comprises:

obtaining, by the one or more data processors, prior observations characterizing prior operation of the network; and jointly processing the prior observations and the current observations in accordance with the current values of the set of machine learning model parameters to generate the output indicating the current state of the network.

14. The non-transitory computer storage medium of claim 11, wherein the execution causes the one or more data processors to perform further operations comprising:

verifying that the current state of the network determined using the machine learning model is accurate;

updating a training data set by logging in the training data set, by the one or more data processors, a training example comprising: (i) the current observations, and (ii) the current state of the network determined using the machine learning model; and adjusting the current values of the set of machine learning model parameters based on the updated training data set using a machine learning training technique.

* * * * *